United States Patent [19]

Nelson et al.

[11] Patent Number: 5,251,700
[45] Date of Patent: Oct. 12, 1993

[54] WELL CASING PROVIDING DIRECTIONAL FLOW OF INJECTION FLUIDS

[75] Inventors: Joseph M. Nelson, Wilmington, Del.; Garland R. Rau, Lewisville, Tex.

[73] Assignee: Hrubetz Environmental Services, Inc., Dallas, Tex.

[21] Appl. No.: 648,659

[22] Filed: Jan. 31, 1991

Related U.S. Application Data

[62] Division of Ser. No. 458,084, Feb. 5, 1990, Pat. No. 5,011,329.

[51] Int. Cl.$^5$ .................. E02D 3/11; E21B 36/00; E21B 43/24; E21B 43/30
[52] U.S. Cl. ........................... 166/305.1; 166/242; 405/128; 405/269
[58] Field of Search ............... 166/242, 241, 222, 223, 166/235, 233, 286, 312, 305.1, 297, 298, 55, 55.1, 50; 175/4.51, 325; 405/128, 269

[56] References Cited

U.S. PATENT DOCUMENTS

| | | | |
|---|---|---|---|
| 2,340,481 | 2/1944 | Lloyd | 166/312 X |
| 2,896,718 | 7/1959 | Kibby | 166/55 X |
| 3,116,800 | 1/1964 | Kammerer | 166/222 X |
| 3,176,771 | 4/1965 | Clairborne et al. | 166/241 X |
| 3,293,863 | 12/1966 | Cox et al. | |
| 3,830,303 | 8/1974 | Perkins | 175/4.51 X |
| 3,908,771 | 9/1975 | Garrett | 175/325 X |
| 4,193,460 | 3/1980 | Gilbert | 175/4.51 X |
| 4,273,201 | 6/1981 | Garrett | 175/325 X |
| 4,348,135 | 9/1982 | St. Clair | 405/36 |
| 4,376,598 | 3/1983 | Brouns et al. | 405/258 |
| 4,469,176 | 9/1984 | Zison et al. | 166/250 |
| 4,518,399 | 5/1985 | Croskell et al. | 405/129 X |
| 4,553,595 | 11/1985 | Huang et al. | 166/50 X |
| 4,670,148 | 6/1987 | Schneider | 210/603 |
| 4,670,634 | 6/1987 | Bridges et al. | 219/10.41 |
| 4,770,336 | 9/1988 | Arterbury et al. | 166/235 X |
| 4,776,409 | 10/1988 | Manchak, Jr. | 175/50 |

FOREIGN PATENT DOCUMENTS

635682  1/1962  Canada ........................... 175/4.51

OTHER PUBLICATIONS

"Superfund Innovative Technology Evaluation (SITE) Program"; HMCRI Conference, Nov. 28-30, 1988.
Brochure by AKI Systems, Inc., Houston, Tex.
"Performance of Selected in Situ Soil Decontamination Technologies: An Air Force Perspective", American Institute of Chemical Engineers 1989 Summer National Meeting, Aug. 20-23, 1989.

*Primary Examiner*—Stephen J. Novosad
*Attorney, Agent, or Firm*—Richards, Medlock and Andrews

[57] ABSTRACT

Disclosed is in situ decontamination methods and apparatus for injecting a hot gas into boreholes formed in a contaminated soil area to vaporize the soil moisture and contaminants, and for collecting the vaporized contaminants at the surface of the soil. A burner heats pressurized gases and mixes the same with combustion gases for injection into the contaminated zone. A central collection system recovers the vaporized contaminants and couples such vapors to an on-site incinerator for disposal. Controlled heating of the injection gas is effective to sequentially remove different types of contaminants, as well as to provide in situ oxidation of other contaminants, while minimizing recondensation of the soil vapors. Wellbore casings are especially adapted for injecting the gas in predetermined patterns. In addition, a heater and incinerator assembly utilizes a single burner for both heating the dry gas and for incinerating the vapor contaminants.

15 Claims, 4 Drawing Sheets

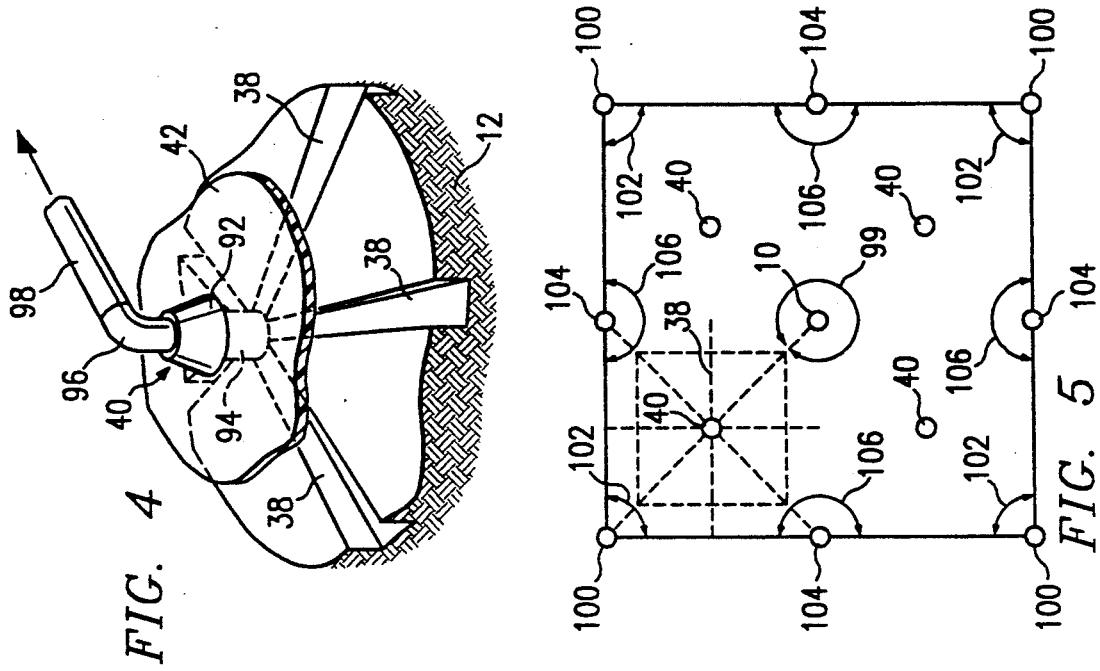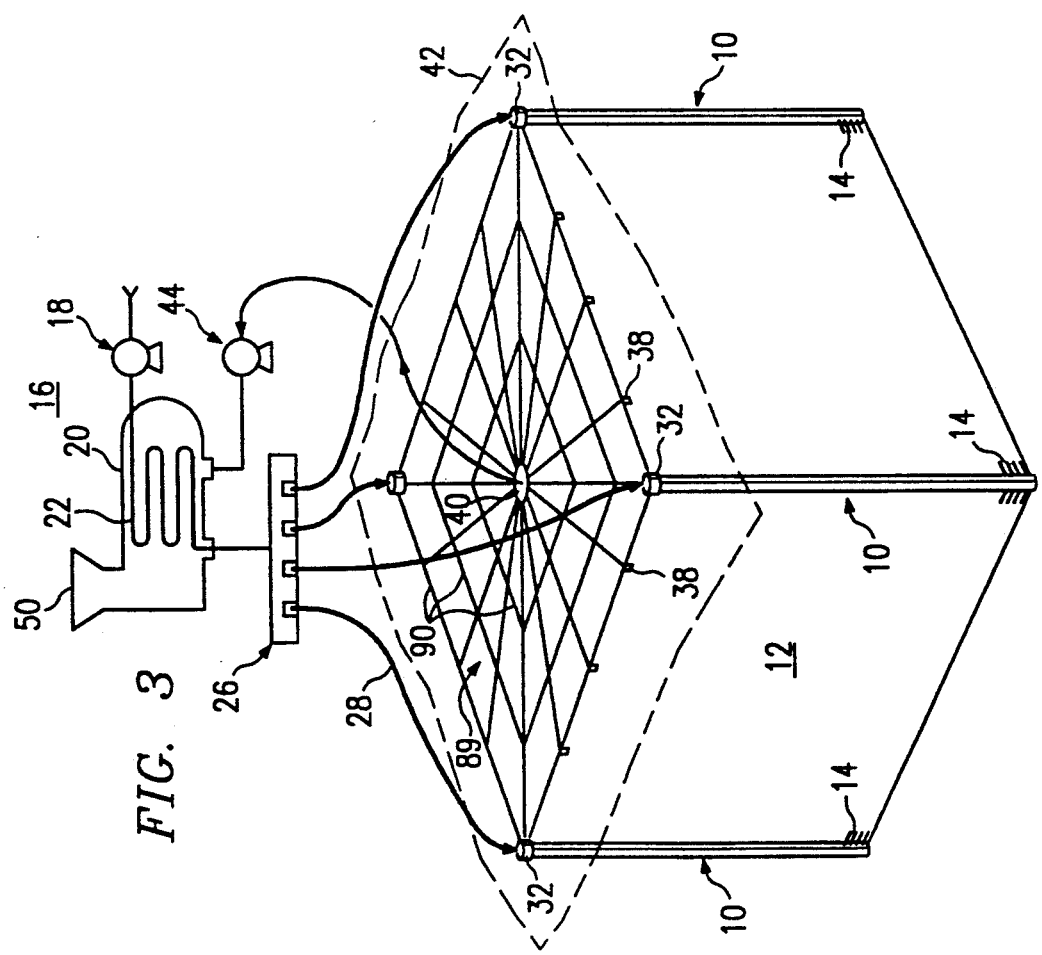

WELL CASING PROVIDING DIRECTIONAL FLOW OF INJECTION FLUIDS

This is a division of U.S. patent application Ser. No. 458,084, filed Feb. 5, 1990, now U.S. Pat. No. 5,011,329.

TECHNICAL FIELD OF THE INVENTION

The present invention relates in general to the treatment of materials to remove toxic or unwanted substances therefrom, and more particularly relates to the in situ treatment of soil to remove or obviate the effects of toxic or undesirable substances.

BACKGROUND OF THE INVENTION

In recent years, a special awareness or interest has been placed on the quality of the environment. This has been due, in a large part, to the realization that many substances, both old and newly developed, can lead to present and future detrimental effects. Chemicals and toxic materials which adversely affect the air, earth or water present a serious concern as to the storing of such substances, and the subsequent environmental cleanup in the event of contamination of the environment by the inadvertent release of such materials.

One environmental concern that has prompted recent investigation and remedial action is that caused by petrochemical spills and leakages into the earth due to defective containers or pipelines. The oil, gas or fuel which contaminates the soil, if not checked, can pollute the soil as well as contaminate groundwater supplies and aquifers. One technique which has been employed effectively to decontaminate soil is to excavate the contaminated area and to process the soil through a kiln at an elevated temperature. While such a technique is effective, it is apparent that the time, cost and labor is appreciable and not cost effective for large contaminated areas.

The in situ treatment of contaminated soil has been carried out by use of neutralizing chemicals and solvents, as well as nutrients and microorganisms to promote in situ biodegradation of the contaminants. In addition, in situ soil flushing has been carried out by injecting solvents or surfactants into the soil to enhance the contaminant solubility. This technique involves the drilling of an extraction well in the contaminated soil zone, the drilling of reinjection wells upgradient of the contaminant area, and the construction of a waste water treatment system. Subsequent to the soil treatment, the groundwater is reinjected upgradient of the extraction well, which then leaches through the contaminated soil. The leachate is then collected, treated and reinjected back into the system, creating a closed loop system.

Yet another in situ treatment of contaminated soil involves a process in which production wells are drilled through the contaminated soil zone to a depth just above the water table. Monitoring wells are drilled around the production wells to monitor pressure gradients. A vacuum is then applied to the production wells. Because of the horizontal pressure gradient created in the soil zone by the vacuum pumps, volatiles in the soil percolate and diffuse through the air spaces between the soil particles to the production well. The vacuum established in the soil continuously draws volatile organic compounds and contaminated air from the soil pores and draws free air through the soil surface down into the soil. The volatiles removed from the monitoring wells are then processed through a liquid-vapor separator. This procedure applies no heat input and is limited in both the rate of contaminant removal and the types of contaminants which can be vaporized.

In another variation of the foregoing technique, the treatment system includes injection wells for injecting steam, hot air and liquid chemicals into the churned soil. Extraction wells operating in a partial vacuum environment provide a horizontal pressure gradient in the soil. The mixture heats the soil and raises the temperature of the chemicals, eventually causing them to evaporate. The evaporated chemicals are drawn horizontally to the extraction wells and piped to a processing system that cools the chemical vapors for conversion into a liquid. The liquid chemicals are then further processed by an incinerator to detoxify the contaminants. One disadvantage of this technique is that the steam is prone to condense in the soil and form a liquid barrier to the further movement of contaminants to the extraction wells. Another disadvantage is that the soil temperature cannot be raised substantially above 212° F. to remove less volatile contaminants.

In U.S. Pat. No. 4,670,634, there is disclosed a technique for decontaminating soil by the use of radio frequency energy to heat the soil. Electrodes located over the surface of the decontaminated area radiate rf energy into the soil and heat the soil to the extent that gases and vapors are produced. The rising gases and vapors are collected by a vapor barrier which operates under a slight vacuum. While the system appears to be effective, the energy requirements are substantial and costly, and the depth of the heat penetration into the soil is limited.

While the foregoing techniques are somewhat effective in providing in situ decontamination of the soil, many of the shortcomings attendant with such techniques are that the processes incur high operating expenses, require expensive equipment or chemicals, and as a final result are not overall extremely effective in reducing contaminants to a very low level.

From the foregoing, it can be seen that a need exists for a technique for the improved in situ removal of contaminants from a material. A further need exists for an efficient method and apparatus for the in situ decontamination of soil to a very low level, and which reduces the possibility of releasing or expelling such contaminants into the air. Another need exists for apparatus for controlling the injection of a heated gas into contaminated soil such that vapor condensation is minimized and permeability of the material to the heated gas is enhanced. Another need exists for the enhanced removal of contaminants by the use of a vertical pressure gradient to thereby eliminate the need for monitoring or extraction wells. Yet another need exists for an efficient utilization of energy, in which combustion gases, which used in heating the injection gas, are also injected into the contaminated soil to raise the temperature so that volatile and less volatile contaminants can be vaporized.

SUMMARY OF THE INVENTION

In accordance with the invention, an in situ soil decontamination is disclosed which substantially reduces or eliminates the shortcomings associated with the corresponding prior art techniques.

According to the invention, a heated gas is injected into wellbores drilled into or below the contaminated zone. As the heated gas horizontally permeates the zone and returns to the surface, the contaminated soil water evaporates and is carried by the hot gas stream to the surface. Surface collection equipment is utilized to collect the vaporized contaminants for further disposal thereof. The water vapor in the gas stream which is initially forced through the contaminated matter is controlled as to temperature and pressure to minimize recondensation and thus prevent flooding of the zone ahead of the hot gas stream. The permeability of the soil is increased and thus the flow rate of the heated gas is not restricted. The gas can be heated upwardly to 1200° F., or higher, to achieve a soil temperature to vaporize volatile and less volatile contaminants, and also to oxidize other contaminants. Accordingly, the rate at which contaminants can be removed from the soil is improved over the prior, well-known steam injection technique.

According to the preferred embodiment of the invention, slotted casings are installed in wellbores drilled in patterned locations in the vadose zone of the contaminated soil. The slotted casings are cemented at the upper ends of the casings so that the hot injected gas can be forced laterally into the soil at the bottom of the well. A vertical cone of soil affected by the pressurized hot gas is that which is within a radius around the bore about equal to the depth of the wellbore. The injection wells are spaced so that the cones overlie each other. An unheated or low temperature gas is initially injected into the wellbores at a pressure of about 15-20 psi which is sufficient to displace the liquid ground water and to establish a steady state gas flow rate. Then, the pressure is reduced to about 8-15 psig, and the temperature of the injected gas is raised in stages to first vaporize volatile components, and then to vaporize less volatile compounds. At a soil temperature of about 800° F., the soil humus is oxidized, as are other contaminants. The temperature and pressure of the injected gas is controlled to minimize condensation of liquid in the soil and thereby optimize the permeability of the soil. By fixing the flow rate of the injection gas, the pressure can be monitored to detect flooding due to condensation.

The surface collection system includes a number of trenches which are dug into the surface of the earth, and which extend in a pattern to one or more central collection points. The entire surface of the soil which is contaminated is covered with an impervious material to trap the vaporized contaminants forced upwardly out of the soil, and to direct the same to the central collection points. A suction blower maintains the surface of the soil at a slight vacuum to achieve a vertical pressure gradient in the soil. From the central collection points, the vaporized contaminants are forced by the suction blower into the firebox side of a heater-incinerator, which also heats the gas previously injected into the wellbores. Alternatively, the vaporized contaminants may be directed by the suction blower into a fired gas incinerator or into a catalytic oxidizer. The gas pumped into the heating system is injected into the soil. Although alternatively, air may be pumped into an adiabatic gas heater, where fuel is mixed with the air and burned to produce high temperature gases under pressure, which is injected into the soil zone to vaporize contaminants. When removing hydrocarbon contaminants from the soil, such contaminants are thermally and oxidatively destroyed in the incinerator, or the catalytic oxidizer, and harmlessly discharged into the atmosphere at the site.

Specialized well casings are disclosed for allowing the hot gases to be directed into the contaminated soil in a predefined pattern, Bladed-casings-having slots formed at the bottom thereof, only around 90° of the casing, can be installed in corner boreholes to direct hot gases into the soil in a zone of about 90°. The blades are fastened to the casing 90° apart to direct the gas emitted from the slots outwardly in a 90° pattern. Other bladed casings having slots formed therearound only on one-half of the casing can be installed in perimeter boreholes for directing hot injected gas in a pattern of about 180°. Boreholes formed centrally within the contaminated soil can be fitted with casings having slots formed all the way therearound to define an injection pattern of 360° around the borehole.

The in situ decontamination method and apparatus of the invention also includes a heater-incinerator assembly which utilizes a single flame to heat the gas for injection in the soil, as well as to incinerate the vaporized contaminants recovered from the soil. Vent gases recovered from the contaminated soil are forced into the burner air stream to furnish combustion air, and at the same time thermally and oxidatively destroy the contaminants. The injection gas is forced into the furnace inside of a heat exchanger, in a direction countercurrent to the combustion gases flowing in the heat exchanger. The injection gas is thus heated by the same burner which destroys the contaminants.

In an alternative embodiment, the injection gas is provided by an adiabatic gas heater in which fuel is mixed with the injection gas under pressure and burned to form a heated gas mixture for injection into the soil. In such embodiment, the vaporized contaminants recovered from the soil are burned separately in a thermal gas incinerator, or alternatively in a catalytic oxidizer.

BRIEF DESCRIPTION OF THE DRAWINGS

Further features and advantages of the present invention will become apparent from the following and more particular description of the preferred embodiment of the invention, as illustrated in the accompanying drawings in which like reference characters generally refer to the same or similar elements or functions throughout the views, and in which:

FIG. 3 is an isometric view which illustrates the surface recovery system employed in accordance with the preferred embodiment of the invention;

FIG. 4 is an isometric view which illustrates a central collection point from which the contaminants are extracted and directed by trenches to disposal equipment;

FIG. 5 is a top view of a contaminated site with spaced apart boreholes which are adapted to direct a heated gas in the soil with a predefined pattern;

DETAILED DESCRIPTION OF THE INVENTION

Figure 1:
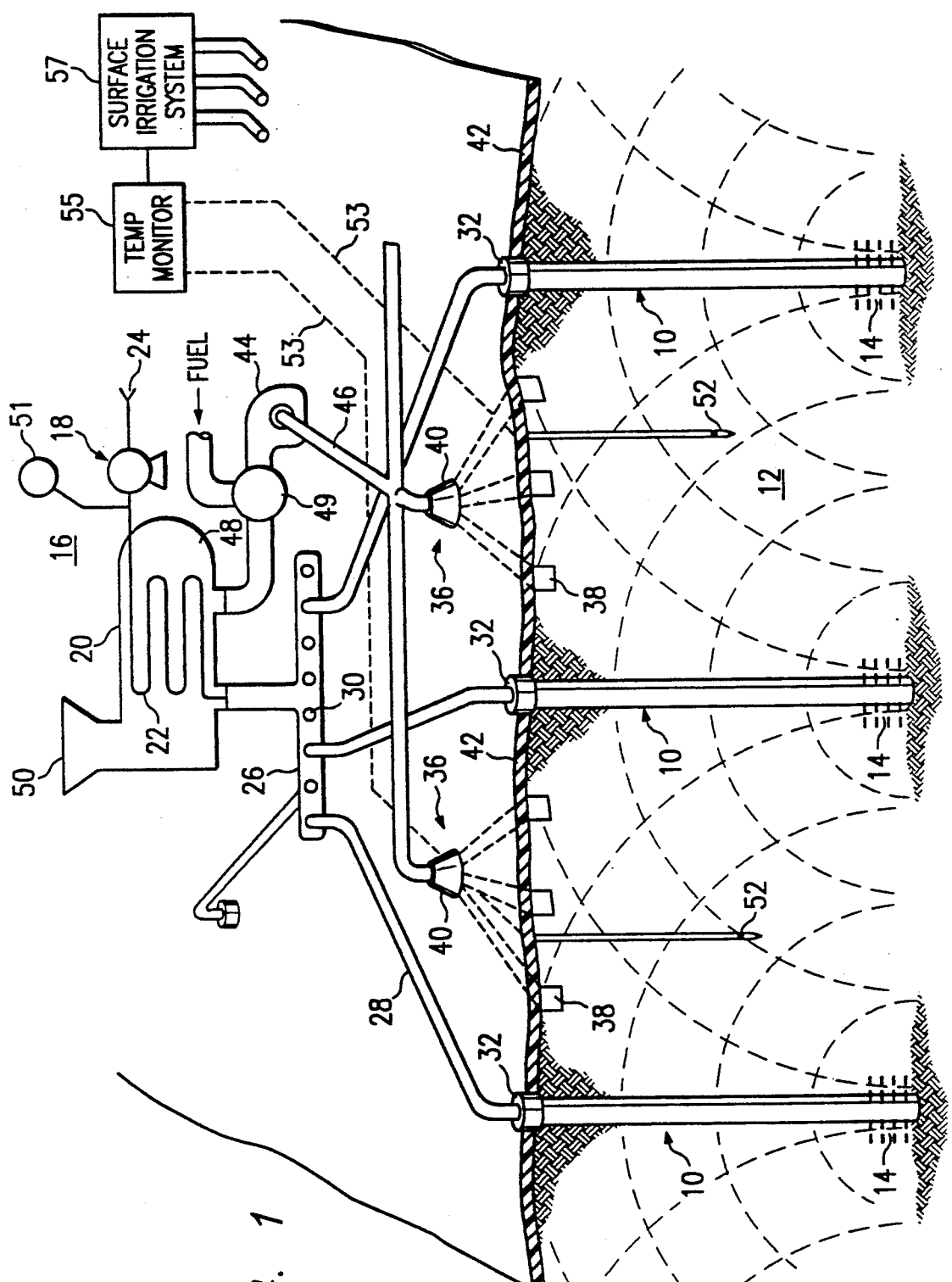
FIG. 1 illustrates the major components of the in situ soil decontamination system of the invention, and particularly a cross-sectional view of the contaminated area and the zone affected by the injected, heated gas.

FIG. 1 is a diagrammatic illustration of the invention in an environment in which it can be advantageously practiced. Shown are a number of hot gas injection wells 10 drilled or otherwise formed in a contaminated soil zone 12. The injection wells 10 are each lined with a casing in such a manner that slots formed at a lower end allow pressurized hot gases 14 to horizontally penetrate the contaminated soil 12. Preferably, the injection wells 10 are drilled to a depth at least as deep as the contaminated soil and preferably somewhat deeper in order to allow the laterally directed gases 14 to permeate all regions of the contaminated soil 12. The decontamination technique of the invention is generally applicable to contaminated materials in the vadose zone, i.e., that zone of the earth above the permanent groundwater level.

As will be described in more detail below, the hot gases 14 are injected into the wells with a heat sufficiently high to vaporize the soil moisture and carry such moisture vapor, as well as vaporized contaminants, under the influence of differential vertical pressure gradients and gravity to the surface of the earth. Such a technique is highly advantageous in removing volatile and less volatile hydrocarbons, as well as other diverse types of contaminants.

A source of pressurized hot gases is shown as reference character 16. In one embodiment, air is utilized as the gas which is heated, pressurized, and injected into the wells 10. The gas heating and pressurization apparatus includes a compressor 18 and a furnace 20 equipped with an internal heat exchanger 22. The furnace 20 preferably includes a fuel-fired burner 49 for heating the heat exchanger 22 to a high temperature. As the compressor 18 draws in air or gases from an inlet 24 and forces such gases through the exchanger 22, such gases reach a temperature which may range upwardly of 1200° F. before injection into the wells 10. The temperature to which the gases are heated is a function of the distance that such gases travel before being injected in the wells 10, as well as the nature of the contaminants to be removed. From the heat exchanger 22, the hot gases exit the furnace 20 and are routed to a manifold 26. The manifold 26 is essentially a large ported structure to which a number of pipes 28 are connected for further routing of the hot gases to the individual injection wells 10. The unused manifold ports 30 are simply capped to prevent the escape from the system of the hot injection gases. The manifold 26, as well as the pipes 28 can be insulated to improve the thermal efficiency of the system.

Each injection well 10 includes a "cross" wellhead 32 for providing instrumentation couplings, as well as apparatus for coupling the hot gas pipes 28 to the casings of the injection wells 10.

A central contaminant collection system 36 is effective to collect the contaminant vapors and gases (vent gases) which have risen to the surface of the soil 12. The contaminant collection system 36 includes a network of trenches 38, all of which are dug toward a central vapor collector 40. Importantly, the surface of the soil 12 is covered with an impervious barrier 42 to prevent the escape of vapor contaminants into the atmosphere. The impervious barrier 42 extends sufficiently beyond the lateral boundaries of the contaminated area. A suction blower 44 is connected to each of the central vapor collectors 40 to draw the vent gases into an input plenum 46 and force such vent gases into the furnace 20. As can be appreciated, the suction blower 44 maintains the trenches 38 generally at a below atmospheric pressure level, thereby drawing the vapor contaminants vertically out of the soil. The necessity for extraction wells is thereby obviated.

In accordance with an important feature of the invention, the vapor contaminants are forced into a high temperature firebox 48 of the furnace 20 where they are incinerated and output via an exhaust 50 into the atmosphere as harmless gases. The combined gas heater and incinerator assembly comprising a tubular coil 22, through which the gas to be heated flows, is arranged in the discharge plenum of a firebox 48 in such a way that the gas being heated flows countercurrently to the direction of the flue or combustion gases generated by combustion of a hydrocarbon fuel in burner 49. This apparatus utilizes as combustion air the vent gases containing hydrocarbon contaminants removed from the soil 12, and forced by suction blower 44 into the burner air inlet ports.

In a typical application, 5000 pounds per hour of air are compressed by compressor 18, from atmospheric pressure to about 18 psig. The compressor 18 can be either a reciprocating piston compressor, a turboblower, or a direct displacement blower. The compressed air is forced through the tubular heat exchanger coil 22 where it is raised from the compressor discharge temperature of approximately 300° F., to the desired injection temperature which ranges up to about 1200° F. The heat required is supplied by burning a hydrocarbon fuel at burner 49 in the firebox 48. By utilizing the vent gases containing the hydrocarbon contaminants removed from the soil 12 as combustion air, the contaminants are thermally and oxidatively destroyed, and converted into harmless carbon dioxide and water vapor, at the flame temperature of approximately 1500° F., or higher. This process is in contrast with prior art techniques, in which the contaminants are generally condensed, collected, and transported to an approved site for appropriate disposal.

As will be described more fully below, themocouple temperature probes 52 may be driven into the contaminated zone 12 to obtain temperature reading. As an alternative, the vent gas temperature may be monitored at the various points of surface recovery, such as in the trenches 38. In any event, the electrical signals representative of soil temperatures are coupled by wires 53 to a temperature monitor 55. The temperature monitor 55 can be connected to a surface irrigation system 57 to irrigate certain soil areas to reduce subsurface channeling of hot injection gases 14. The surface irrigation system 57 is adapted to selectively wet the surface of the soil areas indicated by the temperature monitor 55 as being hotter than other areas.

In order to return moisture to the soil after the decontamination process is completed, water vapor or a mist can be introduced into the compressed gas, such as by a mist injector, illustrated by reference numeral 51. The mist injector 51 can be activated to inject moisture into the compressed air stream, after the burner 49 has been shut off and the air stream has returned to a normal operating temperature.

Having described the basic structural and operational features of the invention, reference is now made to FIG.

2 where further details of the invention are shown. In order to properly and thoroughly remove the contaminants from the soil 12, it must first be determined the extent of the contamination, the type of the soil, porosity, moisture content and the type of contamination. Such information can be obtained by drilling sample boreholes, extracting soil samples, and through laboratory analysis determining the noted information. After the pattern of the contaminated area has been determined, injection wells are drilled within the contaminated soil area, as well as on the border of the area. The wells may be located in and about the contaminated zone, as dictated by soil tests to determine contaminant concentration, soil texture, etc. In the event that the contaminated area is larger than can be accommodated by the in situ decontamination apparatus, various sections of the area can be decontaminated in a sequence, until the entire area has been decontaminated. In this case, a certain degree of overlap between sections may be required in order to assure substantially complete removal of the contaminants.

It has been experimentally determined that the injection gases 14 permeate laterally outwardly from the well 10 to a distance about equal to that of the depth of the well. Hence, the injection wells 10 can be appropriately spaced in and about the contaminated area to assure that complete hot gas permeation of the soil is achieved. As will be described more fully below, the slotted sections in certain of the injection well casings are bladed to direct the hot gases in a specified pattern, and thereby minimize the injection of gases 14 in areas of little or no contamination. Such bladed casings are well adapted for use around the periphery of the contaminated zone 12.

Figure 2:
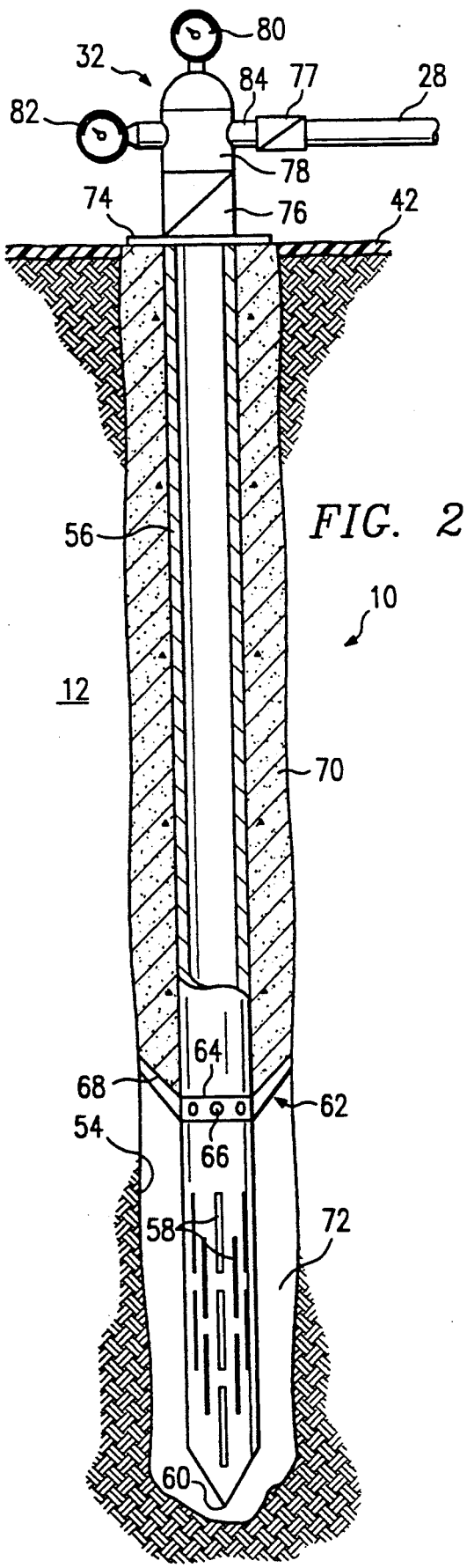
FIG. 2 is a sectional view which illustrates the detailed structural features of a wellbore and casing especially adapted for injecting heated gas into the earth.

In accordance with the preferred technique, the boreholes 54 of the injection wells 10 (FIG. 2) are formed with a diameter of about six inches. A casing, pipe, or tube 56 of about 2 ⅜ inch to 4 inches, depending on the rate of injection desired, is then assembled for lowering into the boreholes 54. The casing 56 is smaller in diameter than the borehole 54, and is preferably constructed of steel. Further, a number of vertical slots 58 are formed in the bottom portion of the casing 56. The slots 58 are about eight inches in length and about ¼ inch in width. While vertical slots are disclosed, other aperture shapes and sizes may function to disperse injection gases 14 with equal effectiveness. The bottom edge 60 of the casing is pinched together and suitably sealed, such as by welding. At a location just above the slots 58 there is removably attached an annular expandable cement basket 62. The cement basket 62 includes an annular flange 64 which is fastened to the casing outer sidewall 56 with shear pins 66. The expandable cement basket 62 includes a conical expandable annular member 68 which allows it and the casing 56 to be lowered into the borehole 54. After the casing 56 and attached expandable cement basket 62 are lowered to the proper location in the borehole 54, the upper annulus is filled with cement 70 and allowed to set. The expandable basket annular member 68 prevents the cement from filling a lower annulus portion 72 of the borehole 54. The cement 70 is of the type which can withstand high temperatures without fracturing, cracking or otherwise deteriorating. Preferably, the high temperature composition is a mixture of Class H cement, silica flour and perlite mixed with water. This mixture has been laboratory tested and is usable at temperatures in excess of about 900° F. In addition, the cement 70 prevents the leakage of the pressurized hot gases 14 upwardly in the borehole, thereby forcing the hot gases 14 to permeate throughout the contaminated soil 12. The cement basket 62 can be sheared from the casing 56 to allow retrieval of the casing 56 after the decontamination process is completed.

A flange or collar 74 screwed to the top of the casing 56 allows for the connection thereto of a ball valve, schematically shown as reference character 76. The ball valve 76 is manually adjustable to seal off the injection well 60 and retain formation pressure after injection is completed. Fixed atop the ball valve 76 is a cross wellhead 78 which is equipped with a pressure gauge 80, a temperature gauge 82 and a fitting 84 for attachment to the hot gas pipe 28. The pressure gauge 80 can be monitored to detect rises in pressure which are indicative of soil flooding due to condensation. The fitting 84 may be any of the well-known type which can withstand the temperature and pressure characteristic of the hot gases. A manually adjustable valve 77 is fixed between the pipe line 28 and fitting 84 to control the rate of injection of hot gases 14 into the well 10. The pipe line 28 is sized to enable delivery of a sufficient volume of hot gases through the contaminated soil, depending upon the porosity and texture thereof. The hot gas pipe 28 is generally sufficient to deliver at least 1500-2500 standard cubic feet per minute (SCM) of hot gases 14 to the injection well 10.

Once the construction of all of the injection wells 10 has been completed, a trench network 89 is formed between the injection wells 10. FIG. 3 illustrates one type of trench layout for recovering contaminated vapors drawn vertically out of the soil 12. Illustrated is a contaminated soil zone 12 which is generally square or rectangular in shape, with a hot gas injection well 10 formed in the earth at the corners of the zone. The trench network 89 includes a number of individual trenches 38 which are arranged radially inwardly toward a central collection point 40. The trenches 38 can be dug to a convenient depth, such as 6-12 inches, with a width of corresponding dimensions. In addition, shown are a number of other trenches 90 which intersect with the radial trenches 38, and are generally orthogonal thereto. Other types or configurations of trenches may be utilized with equal effectiveness to recover the contaminated vapors for incineration, or other disposal.

Preferably, the trenches 38 and 90 are left open to provide conduction channels of the contaminated vapors directed toward the central collection point 40. After the trench network 89 has been completed, the entire area is covered with the impervious material 42. The impervious material 42 can be a heavy gauge, heat resistant foil or other material which is impervious to the type of vapor contaminants brought to the soil surface by the decontamination system of the invention. After the contaminated area has been covered with the impervious material 42, the vapor gas central collector 40 is installed so it is sealed to the impervious material 42 and is connected at a point common of a plurality of the trenches 38. The vapor gas collector 40 is shown in more detail in FIG. 4. The vapor gas collector 40 is constructed of sheet metal, including a bonnet 92 attached to a base 94 which rests on the surface of the earth. The vapor collector 40 is preferably located over an intersection common to plural radial trenches 38. The top of the bonnet 92 includes an elbow 96 which connects to a low pressure return pipe 98 which is coupled to the suction blower 44. The impervious material 42 is fastened around the collector 40 by a band or collar, or other suitable means.

FIG. 5 illustrates a technique for injecting hot gases 14 into the earth in a predetermined pattern commensurate with the shape of the contaminated area. A basic injection well grid pattern is utilized to determine spacing of the injection wells 10. The design of the pattern is dependent on the depth of the base of leachate, concentration of contamination and soil permeability. The basic grid pattern may be expanded or contracted to effectively cover the affected area. For purposes of example, the contaminated area is illustrated as being square. A hot gas injection well 10 is formed centrally within the square, and includes casing slots all around the bottom portion thereof so that the hot gases 14 permeate laterally in a pattern 360° around the well 10. The circumferential hot gas permeation pattern is shown as numeral 99. A cone of hot gas permeation thereby extends entirely around the central hot gas injection well 10. Located at each corner of the contaminated area is an injection well 100 which has slots formed in the sidewall of a bladed casing in a 90° angular area of the casing. The hot gases 14 are directed into the contaminated soil in a pattern of 90°, thereby concentrating the dispersal of hot gases in the corner of the contaminated soil zone. The pattern is shown by the arrow 102. Between each corner hot gas injection well 100 there are formed other boundary injection wells 104 which have slots formed in a lower part of bladed casings covering a 180° angular area thereof. Accordingly, the hot gases 14 forced out of the slots are directed outwardly in a pattern of 180°, thereby concentrating the permeation of hot gases to the soil locations intermediate the corner wells 100 and in the contaminated zone.

Figure 6:
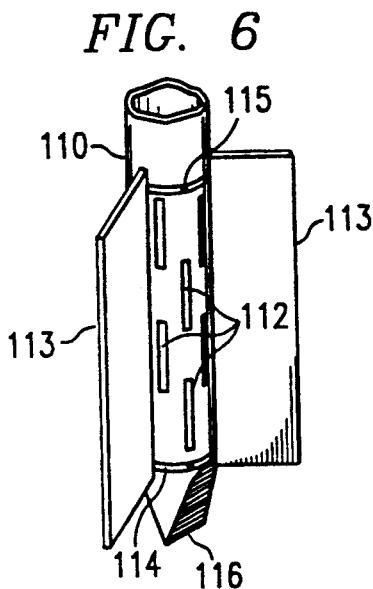
FIG. 6 is a side view of a bladed casing having a quarter section slotted for directing gases in a 90° pattern.

FIG. 6 illustrates a bottom portion of a casing 110 adapted for directing hot gases in a 90° pie-shaped pattern around the wellbore. A number of apertures or slots 112 are cut in the casing 110 in an angular surface area thereof which subtends an arc of about 90°. A pair of blades 113 are spaced apart 90° to enclose the slots 112 and enhance the directionality by which the gas is injected into the contaminated zone 12. The blades 113 may be slightly larger in diameter than the diameter of the borehole to reduce gas leakage therearound. The blades 113 are held together by a pair of metal bands 114 which, in turn, are attached to the casing 110 by shear pins or bolts 115. When it is desired to pull the casing after the decontamination process is completed, the blades 113 can be sheared from the casing should such blades become lodged in the borehole. As further shown in FIG. 6, the casing 110 is pinched together at a bottom edge 116 to cap the bottom end so that hot gases it are forced to exit the borehole in a lateral direction.

Figure 7:
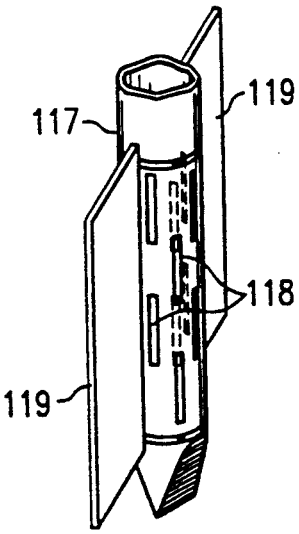
FIG. 7 is a side view of a bladed casing having a half section slotted for directing gases in a 180° pattern.

FIG. 7 is illustrative of another embodiment of a casing 117 in which a number of slots 118 are symmetrically formed around only half of the casing 117. A pair of blades 119, spaced apart 180°, enhance the directionality of the gas injected into the contaminated soil 12. In this manner, hot gases 14 are directed from the casing 117 in a pattern of 180° surrounding the casing 117. It can be appreciated that by forming the slots and blades in patterns other than shown, other directional hot gas patterns can be realized. For example, certain soil conditions may allow for desired directivity of the injected gases by using casings shown in FIGS. 6 and 7, but without the guide blades. It may be found that the resulting pattern of injected gas is lobe shaped, with minor or insignificant spillover into areas of no concern. Yet other techniques of patterned gas injection may be employed, such as backfilling a portion of the borehole around a slotted casing with cement so that the gas escapes only from a circumferential portion of the casing.

Figure 8:
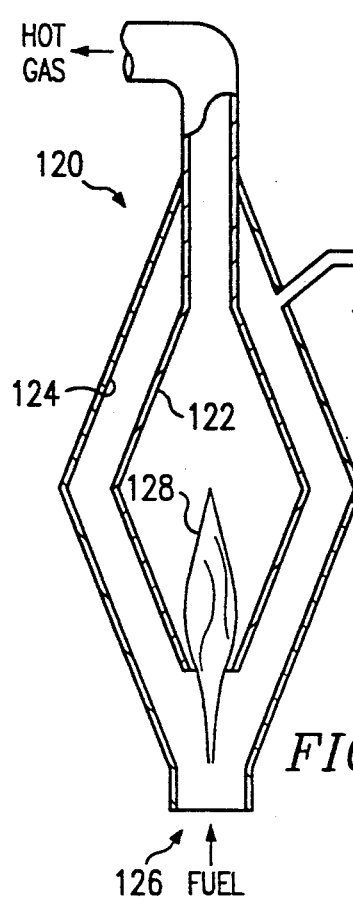
FIG. 8 is a side sectional view of a pressurized gas heater which can be employed for on-site heating of a pressurized gas for injection purposes.

FIG. 8 illustrates an embodiment of a gas heater adapted for use with the invention, should separate heater and incinerator apparatus be desired. An adiabatic gas heater 120 provides hot combustion gases under pressure for injection into the contaminated soil 12. The heater is an assembly in which a biconical flame chamber 122 is suspended inside a biconical exterior housing 124. Air or a gas enters compressor 18 through intake port 24. The air is compressed to the desired injection pressure, typically 15 to 20 psig. The compressed air enters the top of the biconical annulus 124 and flows downwardly in a spiral, thus absorbing the heat transmitted from the inner biconical flame chamber 122, thereby rendering the overall assembly adiabatic. The air then mixed in a burner 126, where it is combined with a hydrocarbon fuel injected to operating pressure through burner 126, and is ignited into a stable flame 128 within the inner biconical chamber 122. Complete combustion is obtained, resulting in a hot flue gas under pressure sufficient for injection into the soil. Typically, it is expected that the flue gas will range in temperature between a compressor discharge temperature of about 300° F. to 1200° F. The composition of the flue gas depends on the temperature at discharge, which is a function of the amount of air in excess of the stoichiometric quantity needed to completely combust the fuel. This excess ranges from infinity, at 300° F. to 4:1 excess at about 1200° F., approximately. Since the compressed flue gas contains moisture of combustion, a considerable amount of excess air is needed so that the moisture content will be low enough to allow the air injected into the soil to absorb and remove additional water. With a 4:1 ratio of excess air, the moisture content will result in a 90° F. dew point. At 300° F., where substantially no combustion takes place, the dew point will be that of the ambient air, typically 40° to 70° F. within this range, which is expected to be utilized during operation, the injected flue gas will have ample capacity to absorb additional water evaporated from the soil. A burner which is adapted to heat a pressurized gas is available from Thermoflux, Inc., of Tulsa, Okla.

Figure 9:
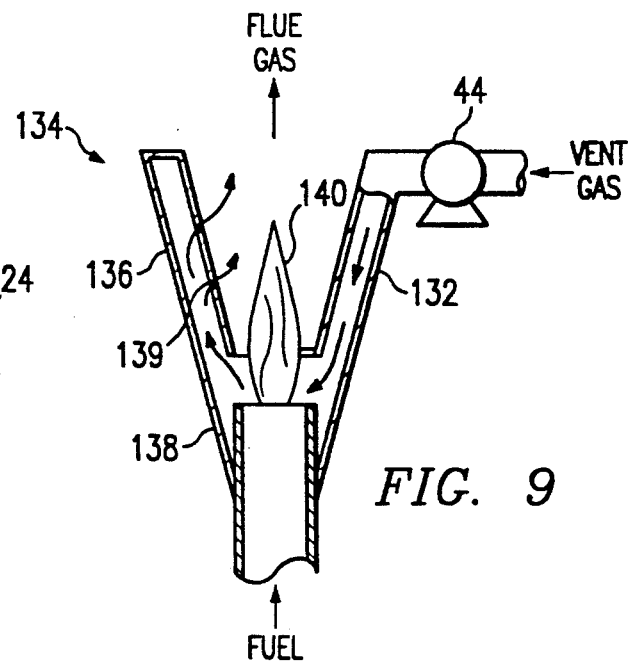
FIG. 9 is another embodiment of a heater which can be utilized for incinerating vaporized contaminants recovered as a vent gas from the soil.

In the event that separate gas heater apparatus and incinerator apparatus is employed, the vapor contaminant disposal technique of FIG. 9 can be utilized. The vent gas from the soil 12, which may contain low concentrations of hydrocarbon contaminants, is recovered from the vent gas collection system under a slight negative pressure by suction blower 44, which injects it into the annulus 132 of an inverted conical incinerator 134. An incinerator suitable for such use is obtainable from Thermoflux, Inc. of Tulsa, Okla. The flue gas enters the conical annulus 136, near the top and recovers heat transferred from the hotter internal cone, as it progresses spirally downward to the apex 138 of the cone, where it is mixed with fuel and burned. Perforations 139 located near the bottom of the annulus 132 allow the heated vent gas to escape with the combustion gases as a flue gas. The high temperature of the flame 140, in excess of 1500° F., causes the contaminants to be thermally and oxidatively converted into harmless water vapor and carbon dioxide for discharge to the atmosphere.

Figure 10:
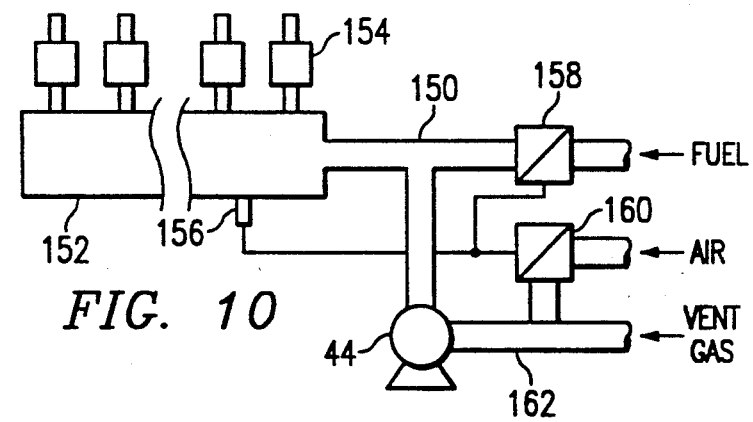
FIG. 10 schematically depicts a catalytic oxidizer for on-site disposal of contaminated vapors.

An alternative to the foregoing decontamination technique is shown in FIG. 10. The main advantage to this latter technique is that it uses less fuel to convert the contaminants oxidatively into carbon monoxide and water. The vent gas from the soil, which may contain low concentrations of hydrocarbon contaminants, is recovered from the vent gas collection system under slight negative pressure by suction blower 44, which injects it into the burner 150, sufficient to raise the temperature of vent gas in the manifold 152 of the vent gas catalytic converter 154 to 300° to 400° F. as required for the operation of the standard automobile catalytic converters. As illustrated, the catalytic converters 154 are arranged in parallel to supply sufficient capacity for the vent gas stream. The converters 154 catalytically oxidize the contaminants and discharge the gas harmlessly to the atmosphere. At times when the vent gas entering the blower 44 is higher than about 400° F., a temperature controller 156 shuts off the fuel to the burner 150 with valve 158 and opens an air valve 160 at the intake 162 of blower 44 to maintain the proper temperature of the gas entering the catalytic converters 154.

Having described the details of the structural features of the invention, the exemplary steps of the in situ soil decontamination technique are set forth below. Soils in general do contain water under normal conditions, but in vastly different degrees. The soil may be saturated or lie beneath the water when the soil is below the water table, or when water has percolated downwardly after surface rains or floods. The water can be contained in the pore spaces between soil particles, or water can be adsorbed on the surface of the particles. Soil which is saturated with water or beneath the water table functions as a barrier to the flow of gases to the soil, at practical flow pressures and rates. The water contained in the pore spaces between the soil particles may, or may not, impede the flow of the injection gases, depending upon the fraction of the pore space which is occupied by the liquid water. On the other hand, in conditions where the water is adsorbed on the surface of the soil particles, such water is not free to flow, but the transmission of gases therethrough is not substantially impeded.

In the event that the contaminated soil is fully saturated with water, such as that which is located below a water table, the water can be gravity drained by the injection wells drilled to or below the bottom of the contaminated zone. Such wells can later serve as the boreholes for insertion of casings to inject the hot gases in the contaminated zone. The wells can be utilized to remove substantially all of the liquid water from the zone.

After the decontamination apparatus has been connected together and tested for operability, the compressor 18 is started, as is the suction blower 44. The burner 49 is not ignited and thus air or gas at a compressor outlet temperature of about 300° F. is forced into the injection wells 10. Initially, the compressor 18 is adjusted to force a gas through the heater-incinerator assembly 20 such that the pressure, as measured at the wellhead, is about 8-15 psig for a well having a depth of about twenty feet. If the contaminated zone is much deeper, for example, fifty feet, it may be necessary to increase the wellhead pressure, for example, to about 20-30 psig, due to the higher hydrostatic head at the greater depth. This initial pressure of the low temperature gas gradually moves the liquid water from the wellbore, thus establishing greater gas permeability within the contaminated soil 12. However, a higher pressure may be required to overcome threshold effects of initially generating a water flow through the contaminated soil 12.

Figure 11:
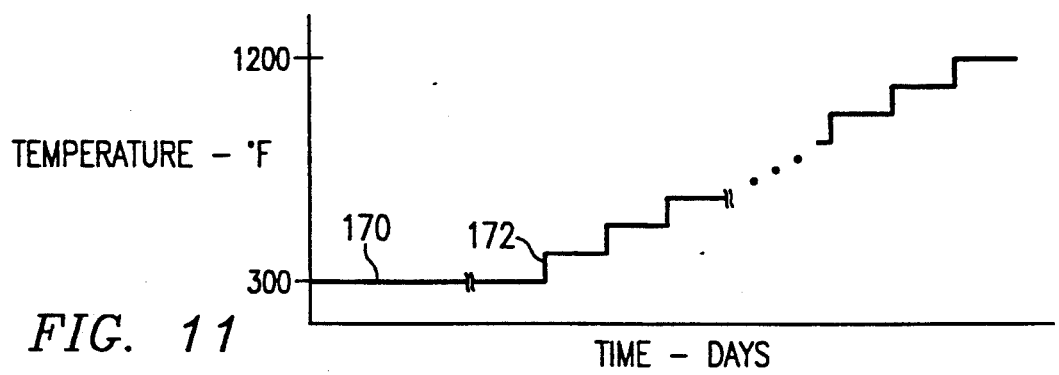
FIG. 11 is a graphical depiction of a time/temperature schedule of gas injection.

The injection of the low temperature gas continues until a steady state flow rate is established. FIG. 11 illustrates a gas temperature schedule believed to be effective in accomplishing the in situ decontamination of the zone 12. Reference numeral 170 shows the steady state injection achieved after the liquid water is substantially removed from the soil 12.

After removal of liquid water, the burner 49 is fired to increase the temperature of the injected gases 14. The procedure for the hot gas injection operation varies, depending upon the type and water content of the contaminated soil. The temperature and pressure of the injected gas 14 is regulated to prevent the formation of condensation ahead of the hot gas front so that the soil formation does not become flooded or water logged, thereby reducing the permeation of the soil and the flow of hot gases therethrough. The hot gases 14 are injected into the contaminated zone by slowly raising the pressure at the bottom of the injection wells. The temperature increase can be at a steady rate, or increased incrementally in predefined steps, as shown by reference numeral 172 of the graph. The hot injected gases 14 displace the remaining liquid water occluded in the pore spaces adjacent to the injection well borehole until the gas can be transmitted from the well bore into the contaminated zone. As heat is applied, some of the initially occluded water evaporates into the air stream, gradually opening the pores, thereby increasing the flow of injection gases 14.

As noted above, when a steady state rate has been achieved at a satisfactorily high gas flow, the temperature of the gas 14 is slowly raised to evaporate additional water from the soil. For illustration purposes, it is believed that a temperature rise of 20° F. every 2-3 hours will be effective to achieve contaminant vaporization without vapor condensation and resultant flooding. As the temperature rise is being carried out, the air stream picks up what moisture it can hold at the particular injection temperature, until the injected gas 14 becomes saturated with water vapor. The gas initially injected into this soil becomes saturated and flows outwardly to cooler zones, whereupon some of the water vapor condenses, so that the air is saturated at the lower temperature of the cooler zone. Preferably, the desire is to raise the temperature of the injection gases 14 very gradually during the early periods when a substantial amount of water is present in the soil pores, such that the recondensation occurring ahead of the heated front is limited to a level that will not completely fill the pores and thus flood the soil. As can be appreciated, such flooding restricts the passage of injected gases 14 and thus limits the rate at which the soil can be further heated. The regulation of temperature and pressure of the heated gas 14 contrasts with the steam injection technique, in that the steam provides the bulk of its heat by condensing and thus maintains the soil ahead of the heated zone in a flooded state.

If, indeed, soil flooding should occur ahead of the heated zone, due to having raised the gas temperature too rapidly, an increase in the injection pressure at a constant gas flow rate can be noticed. Alternatively, when employing a constant injection pressure, a sudden reduction in the flow rate can be detected. When the temperature of the soil is raised to rapidly, too much water may be evaporated in the heated front which could result in increased condensation in the cooler zone immediately downstream therefrom. The increased condensation has the effect of filling the soil pores, thus resulting either in diminished flow or increased pressure, or both. It is thus highly advantageous to monitor the condition of flooding by observing either the flow rate or the gas injection pressure. In the event that condensation of water in the heated front results in a flooded condition, the gas injection temperature can be held constant, and the pressure can be gradually increased to displace the excess liquid in the formation ahead of the flooded zone. Such a procedure is continued until the air flow is reestablished at a desired rate. The gas flow rate and pressure can be regulated by the appropriate controls of the compressor 18.

As the temperature of the soil formation is increased, the contained water is decreased, thereby enabling the gas injection temperature and flow to both be increased. When substantially all of the water has been evaporated in the contaminated soil, which is around 212° F., the injection temperature can be increased toward a maximum amount. Depending on the soil type and consistency, it is expected that generally the soil temperature can be increased about 200° F. per day, thereby raising the soil temperature to about 800° F. in 4–5 days. The flow rate of the heated soil is then limited only by the resistance of the open soil pores, in the absence of water therebetween, or by the gas injection equipment.

It follows that one skilled in the art can utilize this pore flooding phenomenon for useful purposes. For example, it is desirable that the flow of heated gas occurs uniformly from the points of injection at the base of the contaminated zone to the surface, where the vent gases containing removed contaminants can be collected for disposal. Due principally to lack of uniformity in porosity of the soil in the contaminated zone, both laterally and vertically, some non-uniformity of gas flow can be expected. This can be observed by monitoring the temperature profile developed in the contaminated zone by the thermocouples 52 disposed in the contaminated zone 12. In most instances, this non-uniformity can be tolerated and accommodated by continuing the air flow until all the contaminated zone is swept of contaminants. In the case where the non-uniformity results in uneven channelling of the air, such that some zones are not adequately swept, it is desirable to be able to impede the channelling to some extent, so that greater uniformity of sweep is achieved. This may be accomplished by intentionally irrigating or flooding with water the zone where more air is channeled, thus restricting flow. This may be carried out by the selective and controlled addition of water by the irrigation system 57 into the path of channelling. In most cases, this would be done by wetting down the surface over the area where it is desired to reduce flow.

A soil temperature of about 500° F. is sufficient to remove 400° F. end point gasoline which is one predominant soil contaminant. Due to the energy required to raise the soil temperature this amount, some extended heating may be required, to the extent of two to three weeks. In addition, a quick elevation of the soil temperature could cause severe cracking and the resulting failure of complete permeation of the soil, due to escape of the gas through such cracks or fissures. Relatively less volatile compounds can be removed at higher temperatures, and involatile compounds can be oxidized at higher temperatures, such as 800° F. It has been experimentally found that the soil structure remains stable at temperatures up to 800° F. where humus is oxidized completely in about two hours. By carrying out the progressive increases in the temperature of the contaminated soil 12, substantially all hydrocarbon contaminants can be removed. With the foregoing, those skilled in the art can readily devise of other pressure and temperature schedules for removing other types of contaminants.

While the various flow rates and pressures are required to be adjusted-according to the type of soil and contaminants, the parameters identified herein were adapted for experimental soils having 99% sand, reddish in color, angular and of a texture, from very fine to fine. Such soil is subrounded, 1% muscovite and plagioclase. The soil grains tended to be cemented by iron oxide.

After achieving a stabilized injection operation in an actual field test program, a flow rate of about 1000 scf/hr was achieved after seven hours of operation. After several days of operation, an air balloon reached the surface and numerous percolations developed out to a surface radius approximately equal to the depth of the injection well. Preferably, the hot gas injection is carried out at a slow rate and low pressure to reduce the risk of premature breakthrough or fracture of the crust. After several days of hot gas injection, the process stabilized with a steady injection rate of about 2000 scf/hr and a pressure of about 12 psig.

After all of the contaminants have been removed from the soil, the burner 49 can be shut off, but the compressor 18 and the suction blower 44 can continue to operate to provide a circulation of cooler gases through the decontaminated soil. This is especially advantageous as the soil temperature can be restored to sufficiently low values. Unless the decontaminated soil is cooled to a lower temperature, it could remain hot for an extended period of time, due to the insulating properties of soil. As noted above, moisture, by way of a mist injector 51, can be injected downstream of the air compressor 18 or the heater-incinerator 20 in a controlled manner with the cool air to restore the water removed during the decontamination process.

While the foregoing discloses the in situ soil decontamination process by the injection of air and combustion gases, other gases can be injected to improve decontamination, depending upon the soil, temperature, type of decontaminant, etc. For example, oxygen, nitrogen and carbon dioxide are readily available types of gases which can be heated and injected into the soil. In addition, the air or gases can be dehumidified before being injected into the contaminated area.

It is also contemplated that the invention may be readily adapted to reduce the viscosity of surface and subsurface hydrocarbon tars, heavy oils and oil sands by raising the ground temperature to a level which will cause the hydrocarbon substances to transform from a solid to a liquid phase. A system of collection wells can then be employed to pump the liquid hydrocarbons from the affected area. The process can be further used for near surface mining of certain mineral compounds and complexes. Certain gold, silver, mercury, molybdenum and platinum compounds, or other certain nitrates, sulfides, phosphates and bromides are amenable to extraction by the apparatus and methods described above. The vapors are confined and captured at the surface by a hood or vapor barrier and collected appropriately. The method can be utilized for increasing soil permeability over specified areas to enhance the transmissibility, drainage and discharge of fluids or gases in subsurface media. Also, frozen ground can be thawed to allow easier access to existing subsurface installations, or to allow easier access for new construction of subsurface facilities or installations. Frozen fluids and slurries can be thawed in underground pipelines by employing the method of the invention to reestablish a fluid flow in such pipelines. The method can also be utilized for removing moisture from the soil over specific area patterns to create constant thermal conductivity in the soil for engineering or scientific investigations or applications. Also, the method can be employed to maintain soil at a constant elevated temperature to provide a stabilized environment for engineering or scientific investigations or applications, or to stimulate the growth of certain microbial cultures. In that vein, the method can be employed to prolong the growing season of specified plants or biocultures in colder climates. Also, the method can be employed for -uniformly distributing moisture into dry soils for agriculture or engineering purposes by the injection of air and moisture into the subsoil.

A technical advantage of the invention, as described above, is that a burner heats a pressurized air stream, and combines the combustion gases with the air stream for injection into wells drilled in the contaminated zone. The injected gas is heated in excess of 212° F. to temperatures sufficient to vaporize volatile and less volatile contaminants, as well as to oxidize other nonvolatile contaminants. A further technical advantage of the invention is that the injected hot gases rise upwardly through the soil, due to a vertical pressure differential between the surface and the bottom of the pressurized wellbores. The rising action of the hot gases also facilitates the removal of the vaporized contaminates at the surface, without the need of extraction wells. An additional advantage of the invention is the ability to direct the hot gases in a predefined pattern so that energy can be utilized efficiently in the contaminated zone to vaporize contaminants. Yet another advantage of the invention is that energy can be conserved by utilizing a burner-incinerator assembly which employs a single burner to heat the injection gases and to incinerate the vaporized contaminants. Other advantages of the invention are apparent to those skilled in the art.

While the preferred embodiment of the invention has been disclosed with reference to a specific hot gas injection apparatus and method, it is to be understood that many changes in detail may be made as a matter of engineering choices without departing from the spirit and scope of the invention, as defined by the appended claims.

What is claimed is:

1. A casing fixed in a wellbore to direct a fluid in a predetermined pattern, comprising a tubular member having formed in at least a lower section thereof a plurality of apertures in a sidewall thereof, said apertures being bounded by a pair of blades extending outwardly from said casing for directing the fluid discharged from said apertures in a predefined wellbore area while other areas of the wellbore are unaffected by the fluid.

2. The casing of claim 1, wherein an end of said casing in which said apertures are formed is closed by opposing sidewall portions of said casing being pinched together.

3. The casing of claim 2, wherein said pinched casing portion is welded to prevent the escape of fluid therefrom.

4. The casing of claim 1, further including in combination a cement basket removably mounted to said casing at a location above said apertures.

5. The casing of claim 1, wherein said apertures are formed in said casing on only a 180° portion of said casing so that the fluid directed from the apertures enters the wellbore in an arcuate area encompassing about 180°.

6. The casing of claim 1, wherein said apertures are formed in only a quarter section of said casing so that a fluid is directed in a 90° pattern.

7. The casing of claim 1, further including means for attaching the blades to the casing with shear pins.

8. The casing of claim 7, further including a band attached to each said blade, said band encircling said casing and attached to said casing by said shear pins.

9. A casing for use in a wellbore to direct a fluid in a predetermined pattern, comprising:
   a bottom of said casing having a closed end;
   a plurality of apertures formed at least in a bottom portion of said casing for allowing the passage therethrough of the fluid;
   said apertures being formed in only a circumferential arcuate section of the casing with the remaining circumferential arcuate section being nonapertured;
   a pair of vertical planar blades attached to said casing so that the apertures are located between said blades; and
   whereby pressurized fluid exits the casing through the apertures in a predetermined pattern.

10. The casing of claim 9, wherein said planar blades are shearably fastened to said casing.

11. The casing of claim 9, further including in combination a borehole in which said casing is disposed, and a settable material disposed around said casing except where the perforations are formed therein.

12. The casing of claim 9, wherein said apertures comprise elongate slots each with a longitudinal axis parallel to an axial axis of the casing.

13. A method for directing a fluid outwardly from a well casing in a directional pattern, comprising the steps of:
   fixing an apertured casing in a wellbore formed in the earth, said casing having a plurality of apertures formed in at least a bottom portion thereof and only circumferentially about a portion of the casing;
   blocking annulus of the wellbore above the casing apertures;
   pumping a fluid down the casing so that the fluid is forced out of the casing apertures; and
   directing the flow of the fluid in the annulus adjacent the apertures between a pair of planar blades attached vertically along outer sidewalls of the casing, and causing the blades to engage the earth material of the wellbore to channel the fluid outwardly in a selected area of the earth material and not directed to other portions of the earth material of the wellbore.

14. The method of claim 13, further including blocking the annulus with cement.

15. The method of claim 13, further including attaching the planar blades to the casing with shear pins.

* * * * *

UNITED STATES PATENT AND TRADEMARK OFFICE
CERTIFICATE OF CORRECTION

PATENT NO. :   5,251,700
DATED      :   October 12, 1993
INVENTOR(S) :  Garland R. Rau It is certified that error appears in the above-identified patent and that said Letters Patent is hereby corrected as shown below:

On title page, Item [19]:   "Nelson et al." should read --Rau--.

Item [75]:   "Joseph M. Nelson and Garland R. Rau" should read --Garland R. Rau --.

Column 16, line 52, after "blocking", insert --an--.

Signed and Sealed this

Sixth Day of September, 1994

Attest:

BRUCE LEHMAN

Attesting Officer        Commissioner of Patents and Trademarks